US009970306B2

(12) United States Patent
Pasetto (10) Patent No.: US 9,970,306 B2
(45) Date of Patent: May 15, 2018

(54) FLUID DYNAMIC MACHINE WITH ONE OR MORE IMPELLERS WITH RESTRAINED CONTROL MOBILE BLADES

(71) Applicant: Piergiorgio Pasetto, Bolzano (IT)

(72) Inventor: Piergiorgio Pasetto, Bolzano (IT)

(73) Assignees: Piergiorgio Pasetto, Holzano (IT); Carlo Haroni, Trieste (IT)

( * ) Notice: Subject to any disclaimer, the term of this patent is extended or adjusted under 35 U.S.C. 154(b) by 750 days.

(21) Appl. No.: 14/359,435

(22) PCT Filed: Nov. 20, 2012

(86) PCT No.: PCT/EP2012/073130
§ 371 (c)(1),
(2) Date: May 20, 2014

(87) PCT Pub. No.: WO2013/076094
PCT Pub. Date: May 30, 2013

(65) Prior Publication Data
US 2014/0308130 A1 Oct. 16, 2014

(30) Foreign Application Priority Data

Nov. 21, 2011 (IT) .............. BZ2011A0058

(51) Int. Cl.
*F01D 7/00* (2006.01)
*F03B 17/06* (2006.01)
(Continued)

(52) U.S. Cl.
CPC .............. *F01D 7/00* (2013.01); *F03B 17/067* (2013.01); *F03D 3/068* (2013.01); *F03B 17/065* (2013.01);
(Continued)

(58) Field of Classification Search
CPC ....... Y02E 10/28; Y02E 10/74; F03B 17/067; F03B 17/065; F03D 3/068; F03D 3/067;
(Continued)

(56) References Cited

U.S. PATENT DOCUMENTS

| 1,584,810 A | * | 5/1926 | Sargent | ................. B64C 11/005 |
|---|---|---|---|---|
| | | | | 416/121 |
| 5,324,164 A | | 6/1994 | Doering et al. | |

(Continued)

FOREIGN PATENT DOCUMENTS

| DE | 494685 C | 3/1930 |
|---|---|---|
| FR | 2500076 A1 | 8/1982 |

(Continued)

OTHER PUBLICATIONS

Demodromic definition; printed Dec. 1, 2016.*

*Primary Examiner* — Kevin Murphy
*Assistant Examiner* — Kelsey Cary
(74) *Attorney, Agent, or Firm* — Jacobson Holman, PLLC.

(57) ABSTRACT

A turbomachine, comprising a housing, at least two blade wheels rotatably accommodated by the housing, at least two rotatably arranged blades, which are evenly distributed along a circle of the at least two blade wheels and mounted with an axle parallel to the axis of the corresponding blade wheel. According to the invention, each blade axle is connected to an adjusting element, which can be displaced relative to the shaft of the second blade wheel via a four bar link, which lies in a plane perpendicular to the blade axle and consists mainly of a square arm that is fixed to the axle of the blades, wherein a square arm is articulated to the bottom of the blade wheel, whereas the other end is connected to the end of the first square arm via a connecting axle.

8 Claims, 11 Drawing Sheets

(51) Int. Cl.
 *F03B 3/06* (2006.01)
 *F03D 3/06* (2006.01)
(52) U.S. Cl.
 CPC .......... *F03D 3/067* (2013.01); *F05B 2260/72* (2013.01); *Y02B 10/30* (2013.01); *Y02E 10/28* (2013.01); *Y02E 10/74* (2013.01)
(58) Field of Classification Search
 CPC .......... F01D 7/00; F04D 29/36; F04D 29/362; F04D 29/366; F04D 29/283; F04D 29/287
 USPC .......... 416/108, 128, 99, 129, 111, 112, 124, 416/127, 130
 See application file for complete search history.

(56) References Cited

U.S. PATENT DOCUMENTS

| | | | |
|---|---|---|---|
| 8,882,463 B2 * | 11/2014 | Pasetto | ................ F03B 17/065 416/111 |
| 2011/0110779 A1 | 5/2011 | Stephens et al. | |
| 2011/0272948 A1 | 11/2011 | Stephens et al. | |

FOREIGN PATENT DOCUMENTS

| WO | 80/00991 A1 | 5/1980 |
|---|---|---|
| WO | 2010/013126 A2 | 2/2010 |

* cited by examiner

FLUID DYNAMIC MACHINE WITH ONE OR MORE IMPELLERS WITH RESTRAINED CONTROL MOBILE BLADES

BACKGROUND OF THE INVENTION

Field of the Invention

The present invention refers to a fluid dynamic machine with at least one blade impeller controlled according to the identifying section of claim 1.

BRIEF SUMMARY OF THE INVENTION

A machine of this type was described in Italian patent application BZ 2008 A 000 030 of 30 Jul. 2008. In that application, each blade axis is connected through transmission means to a rotatable sleeve on the impeller shaft. These transmission means, still in the same application, comprise a conical wheel integral with the axis of each blade, a conical wheel engaging with the latter, a rod supporting the latter and rotatable supported by the impeller, a conical wheel integrally supported by the rod and a conical wheel integrally supported by the sleeve. In this way, the blades were orientable so as to be covered by the fluid with a high performance in the rotation of impeller about its shaft. It has now been found that the orientation of the individual blades within the fluid could be diversified with the aim of obtaining a variable thrust from or in the fluid regardless of the number of revolutions.

The aim of the present invention therefore to find other solutions for the coordinated orientation of the blades and at the same time to make the structure of the fluid dynamic machine as compact and simple as possible.

This aim is achieved by a fluid dynamic machine with desmodromically guided blade impellers with the characteristics as per claim 1.

The orientation movement is obtained by individually connecting each blade axis to a movable organ with respect to the impeller shaft, through an articulated quadrilateral of levers and rods, lying on a perpendicular plane to the blade axis; one arm of the quadrilateral becomes integral with the blade axis, another arm of the quadrilateral is articulated to one end on a plane of the impeller while at the other end it is connected to the blade arm through a connection rod; the arm articulated to the plane of the impeller is desmodromically articulated and sliding through a block-guide pair integral with the shift organ assembly. It is clear that for each blade the same type of quadrilateral of rods and levers and block-guides is repeated individually up to the shift organ. The simultaneous rotational pull of the guides assembled on the respective collar being part of the shift organ, in coincident movement with respect to the movement of the respective impeller, is ensured through a geometry of levers and rods that ensures its free decentring in all directions. It is also clear that the same mechanisms and articulations are repeated in coordination for each impeller.

In a first embodiment, the shift organ comprises a sort of perforated bell which is supported and articulated to the body of the machine through a spherical housing, which enables the swinging in all directions of the bell body; actuator means (two or more) in turn articulated both to the machine body and the bell, are envisaged for shifting the bell itself with oscillating movement having a virtual centre of rotation lying in a central axis of the machine, and so as to be able to eccentrically orient it with a precise and decisive movement. A double collar is slidably arranged on the bell, which transforms the swinging movement into a radial direction lying on an orthogonal plane to the central shaft of the machine. The double collar itself mounts outwards a radial bearing for each impeller, onto which all the respective block-guides of each quadrilateral-blade are mounted.

In a second embodiment, on the other hand, the bell is missing, the collar is not double but single and, whilst keeping its axis parallel to the central axis of the machine, it can undergo a controlled decentring or eccentric shift on a plane orthogonal to the machine axis. The collar towards its inside is complete with a ring-shaped plate, which has four straight slots, orthogonal and equidistant from one another and with respect to the central axis of the collar; in these slots blocks move to support and move the collar itself; each block is in turn supported and moved at its centre by an articulated shaft with a parallel axis to the axis of the collar; said shaft is integral with a lever with an arch movement parallel to the shift plane of the collar and mounted and moved by a shaft having a parallel axis to the central machine axis; said shaft rotates and is supported by a housing integral with the machine structure; in the upper part of the axis a second lever is integral, which is moved in turn by an actuator articulated to the machine structure. Clearly this lever and shaft system is repeated for each slot. In order to optimise the shift of the collar, four actuators are provided with a coordinated movement. The collar in the external part mounts the radial bearings in the same shape and functionality as the first embodiment of the shift organ.

In a third possible embodiment of orientation control, it is possible to provide in the upper part of the shift organ, two large slots at right angles to one another which, slidably guided fixed with the organ, are moved by two actuators articulated to the machine body, along two parallel planes to the shift of the collar. The combined movement of the two slots forms the desired decentring. The shift organ is supported by the actual slot system itself. The machine, as a whole, can be likened to slow turbines with an orthogonal axis to the flow direction of the fluid, and operating with normally two (single or multiple) coaxial impellers (concentric or opposing). The machine is built to produce a thrust, or to intercept and capture the maximum amount of kinetic energy in the flow of fluid (normally water) in which it operates; the peculiarity lies in the possibility to dose the maximum exerted power from zero, regardless of the direction (which is however controllable) and the number of revolutions.

Each impeller consists of a rotating circular body and has a number of blades (two or more) arranged and equidistant on a virtual circumference, whose diameter is taken as primitive diameter of the impeller. On each impeller the blades have an optimal hydrodynamic section and each one can be oriented on its own axis of rotation parallel to the central machine axis, with a fluid and alternate movement in both directions and controlled via a geometry of mechanisms (among the most diverse and common ones technically known) envisaged and built to simultaneously determine the precise angulation position of each blade with respect to the others, to the impeller supporting them, and according to the flow direction of the fluid. All the mechanisms pertain to a single central collar which, appropriately oriented, allows its simultaneous and respective angulation alignment, regardless of the individual rotary movements of the impellers.

The mechanical connections of the movements can be freely chosen according to the appropriate design requirements, as long as the orientation angulations thereof are respected, according to the thrust given or the kinetic energy captured in the fluid, and the position assumed moment by moment with respect to the rotation of its own impeller. The movement of each blade is harmonic with angulated fluid oscillations and without sudden realignments, since they are actuated following a virtual path (parasinusoidal) which can be likened to that of a cam having a variable shape, according to the size and control adjustment, and for the purpose of proportioning the energy given or received in the fluid. The appended drawings are schematic and exemplificative of the mechanisms.

The orientation of each blade is organised so as to make it rotate through a certain angle on its own axis in the two directions and in coordination with the rotation of its own impeller. This is valid simultaneously for all the affected blades on the primitive circumference of the respective impeller.

The two impellers rotate in opposite directions to one another. This introduces various advantages: it contributes to cancelling out the torsional reaction result in the fluid which could tend to make the machine assembly rotate, also with respect to the base supporting it; it centres the result of the various thrust forces of the blades at the axis of rotation enabling the adoption of a single machine instead of two alongside one another rotating in opposite directions; it does not cause shifting effects due to the set direction; it enables shorter blades to be used and therefore more contained structural strain.

The angular rotation speed of the impeller with the greater diameter is normally slower with respect to that with a smaller diameter, in order to maintain more or less the same peripheral speed between the impellers, which is proportional to the affected fluid dynamics. The angular speed of each individual impeller may be independent or coordinated with a precise ratio between the two impellers. According to requirements, it is possible to perform a mechanical choice of a free coupling with two force inputs-outputs, with a differential or proportionally restricted.

The counter rotation of the two impellers implies an angulated dynamic force on the blades which, according to their position and inclination and deviating the affected flow portion, direct the fluid onto the adjacent and subsequent blades between one impeller and another with improved synergy, until the system is crossed completely. The shape of the blades is a hydrodynamic profile, with dimensions that can vary between the two groups of blades per impeller. The dimensions of the machine and the impellers, as well as the dimension, shape and number of blades, are proportional to the envisaged power and the physical characteristics of the fluid and environment in which the work is performed. The construction materials of the machine are therefore chosen following a suitable targeted design.

The machine is usually envisaged for operating with a vertical axis, however, it can be operated with any arrangement and angulation, as long as the axis remains orthogonal to the fluid flow. The advantage with respect to other machines is that in this way it is possible to easily orient the blades only, even when the machine is at full power and operation, without having to orient the entire assembly, with remarkable dimensional and structural advantages on the response speed dynamics during manoeuvres.

By acting on the adjustment and orientation of the blades the fluid dynamic force of any size can be directed, indifferently towards any direction within 360 degrees. The action is always central to the axis, continuous and adjustable from zero to maximum even with the motor with constant revolutions, and free from vibrations thanks to the always constant and harmonic oscillations of the blades (without violent angular realignment returns) during the rotation of the impeller. Harmonic and fluid movements can enable a potential increase in the number of revolutions with respect to other systems.

BRIEF DESCRIPTION OF THE DRAWINGS

Further characteristics and details are provided in the appended claims and drawings. In the drawing FIG. 1 schematically shows a fluid dynamic machine according to the invention in an axial section in a first embodiment.

DETAILED DESCRIPTION OF THE INVENTION

As shown in the figures, reference number 1 indicates as a whole a fluid dynamic machine according to the invention. The impellers 3 and 4 are supported therein during operation. The machine itself can in turn be applied to a stationary or mobile structure according to the allocation of the work.

The machine 1 has a hollow body 2 whose extended part contains force input mechanics, the rotation of the impellers and the central alignment organisation of the blades.

In the hollow body 2 the external impeller 3 and the internal impeller 4 are housed concentric to one another. They could also be arranged opposite one another. Each impeller is equipped along a circumference with shafts 5 supporting blades 6. Appropriately the external impeller 3 is supported rotatably by a bearing arranged in the hollow body 2. The internal impeller 4, on the other hand, is supported rotatably by a bearing 8 arranged in the larger impeller so that the smaller impeller 4 can be rotated in the larger impeller 3. Through a bevel gear 9 the external impeller 3 is connected with the outside. The ratio is studied according to the angular speed envisaged and in relation to the internal impeller 4. The internal impeller 4 is moved by a shaft 14 and is connected rotatably through a bevel gear 10 with the outside. The ratio is studied according to the angular speed envisaged and in relation to the external impeller 3.

The bevel gear 9 is connected with a pinion gear 11 with force and rotation input of the external impeller 3, while the bevel gear 10 is connected with a pinion gear 12 with force and rotation input of the internal impeller 4. With pinion gears 11 and 12 it engages with the gears 13 of a motor shaft. The ratio with the input pinion gears is designed according to the angular speed envisaged. The combination is important for the rotation direction of the respective impellers. Individual motor inputs can be provided for each impeller, or a differential combination.

The internal impeller 4 is integral with a central connection shaft 14 which integrally supports the conical crown of the bevel gear 10.

A spherical articulation collar 15 is arranged on an orientation and movement bell 17. It is supported by the body 2 and allows the oscillation of the bell 17 in all directions. It does not allow the rotation of the bell on itself, but its oscillation about a central orientation fulcrum 16 of the control bell 17.

The movement bell, articulated in 15 is controlled through an articulated collar 18 by actuators 35 that with their combined movement, cause its precise and well controlled oscillation.

A spherical articulation collar 19 at the base of the bell 17 supports respective rings 20 and 21 with the interposition of a bearing 220 integral with the external surface of the collar 19.

A guide 22 is integral respectively with the ring 20 envisaged for the external impeller 6 in which a lever of a leverage system 25 slides connected with each blade 6 of the external impeller 3.

A guide 23 is integral respectively with the ring 21 envisaged for the internal impeller 4 in which a lever of a leverage system 26 slides connected with each blade 6 of the internal impeller 4.

The guide 22 (one per blade) of the external impeller 3 allows the controlled two-directional movement of the leverages 24 of the blade without interfering with the other directions on the impeller plane.

The guide 23 (one per blade) of the internal impeller 4 allows the controlled two-directional movement of the leverages 27 without interfering with the other directions on the impeller plane.

The leverage system 24 (each one per blade) for moving the blades of the external impeller 3 is activated by the respective sliding articulation 22 controlling the angulation of the blade at each fraction of a revolution of the impeller. It is integral in the fulcrums on the respective impeller.

A leverage system 25 pulling the bearing collar 20 is integral in the fulcrums and pulled in turn by the external impeller 3.

A leverage system 26 pulling the bearing collar 21 is integral in the fulcrums and pulled in turn by the internal impeller 4.

A leverage system 27 (each one per blade) for moving the blades of the internal impeller 4 is activated by the respective sliding articulation 29 controlling the angulation of the blade at each fraction of a revolution of the impeller it is integral in the fulcrums on the respective impeller.

A central movement collar 28 is supported and moved by sliding articulations 29 that slide in respective slots 34 and supports the respective rotation bearing collars 20 and 21 of the impellers 3 and 4.

Four sliding articulations 29 support and move the central collar 28 and are controlled by respective lower levers 30.

The four lower movement levers 30 of the sliding articulation 29, as well as moving it, support the central collar 28. They are manoeuvred and suspended by a respective shaft 31.

Four control and support shafts 31 of the lower levers 30 are controlled in rotation by upper levers 32 and each one is articulated in a support 33.

Four upper movement levers 32 of the shaft 31 are controlled by an actuator system 35. Four sustaining supports and articulations of the lever and shaft assembly 30) 31) 32) are integral with the extended part of the upper body 02.

Four sliding slots 34 of the sliding articulation 29 are an integral part of the central movement collar 28.

The four actuators are arranged at 90 degrees in a plan view. They are articulated onto the body 2. Their coordinated movement, by acting on the levers 32, allows a precise and controlled movement of the central collar 28.

Figure 1:
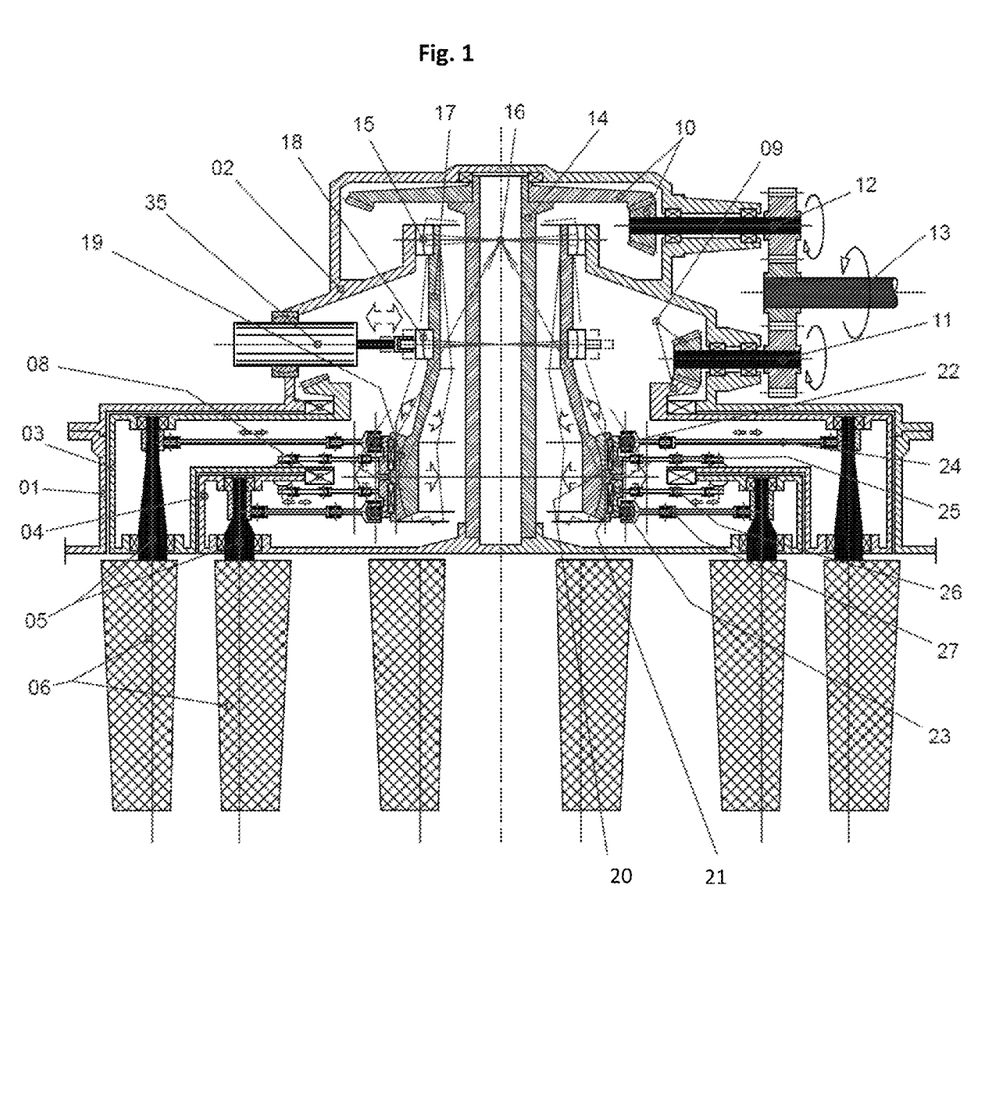
Figure 2:
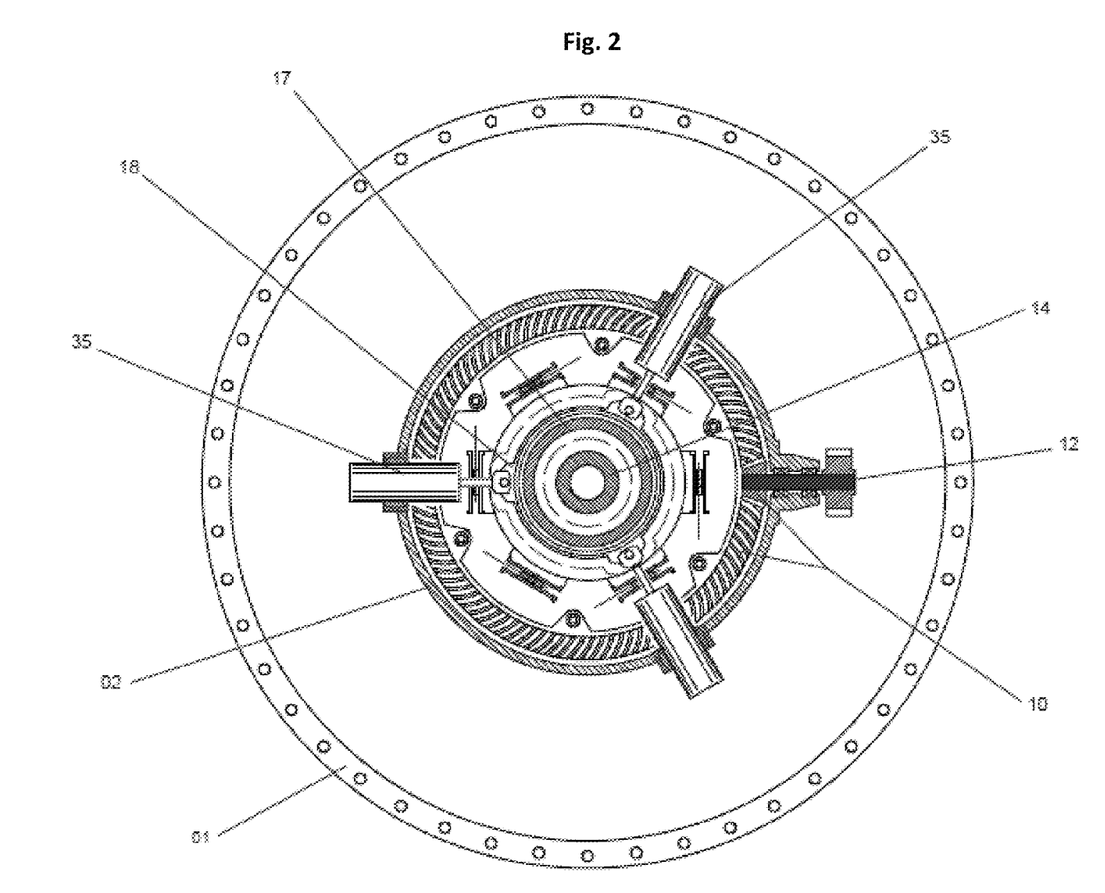
FIG. 2 is a cross section, that is, perpendicular to the axis of the shaft of FIG. 1.
Figure 3:
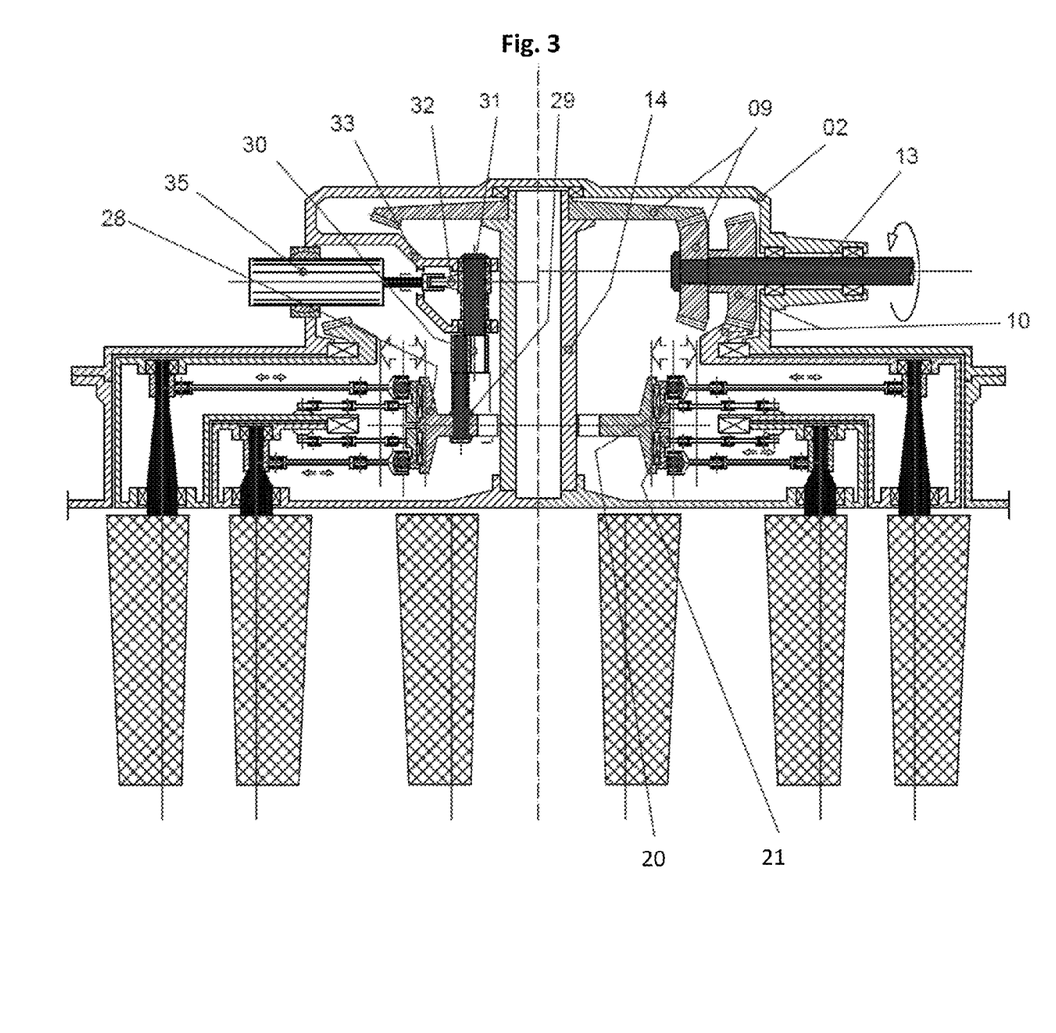
FIG. 3 schematically shows a fluid dynamic machine according to the invention in an axial section, in a second embodiment.
Figure 4:
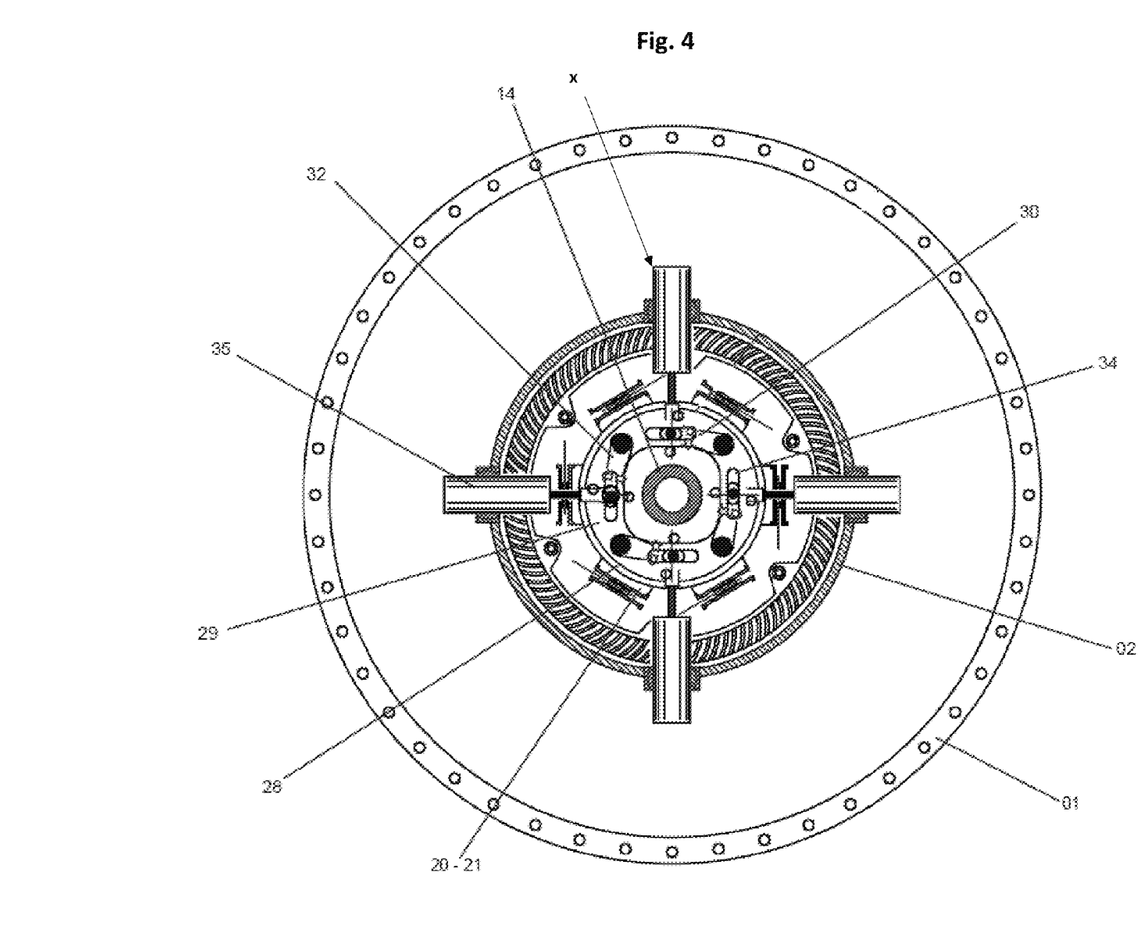
FIG. 4 is a cross section of FIG. 3.
Figure 5:
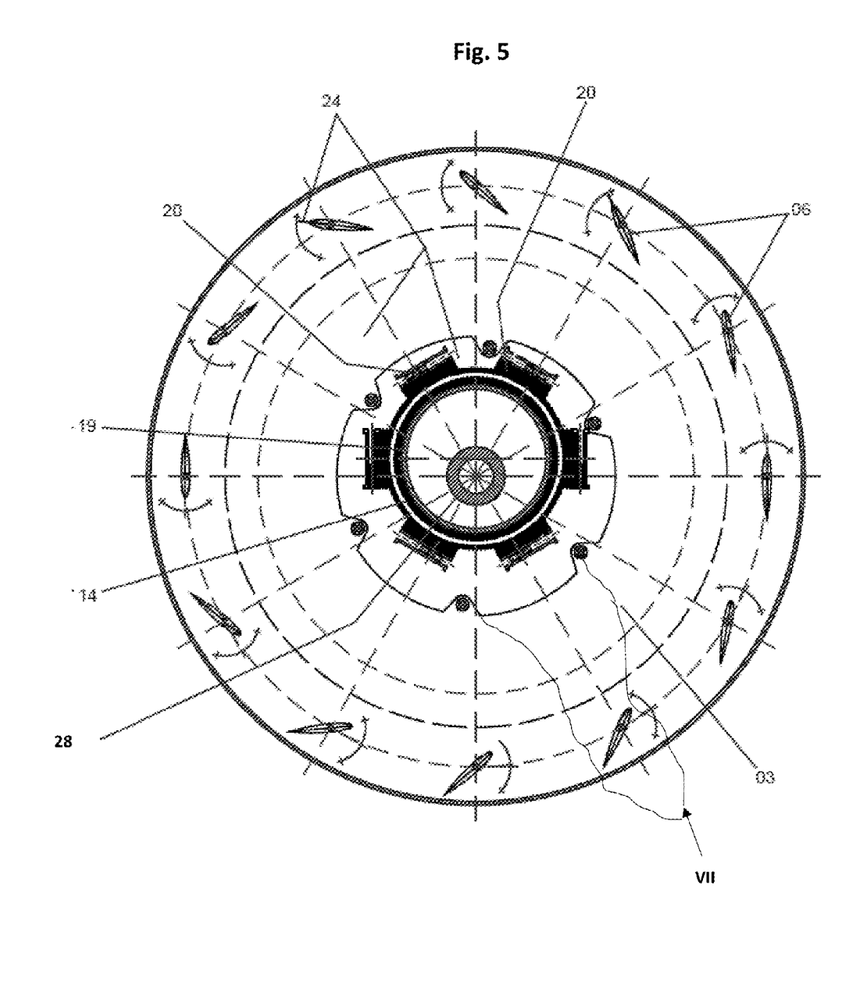
FIGS. 5 and 6 represent a front schematic view of the machine according to the invention in two different operating positions of the internal and the external impeller respectively.
Figure 6:
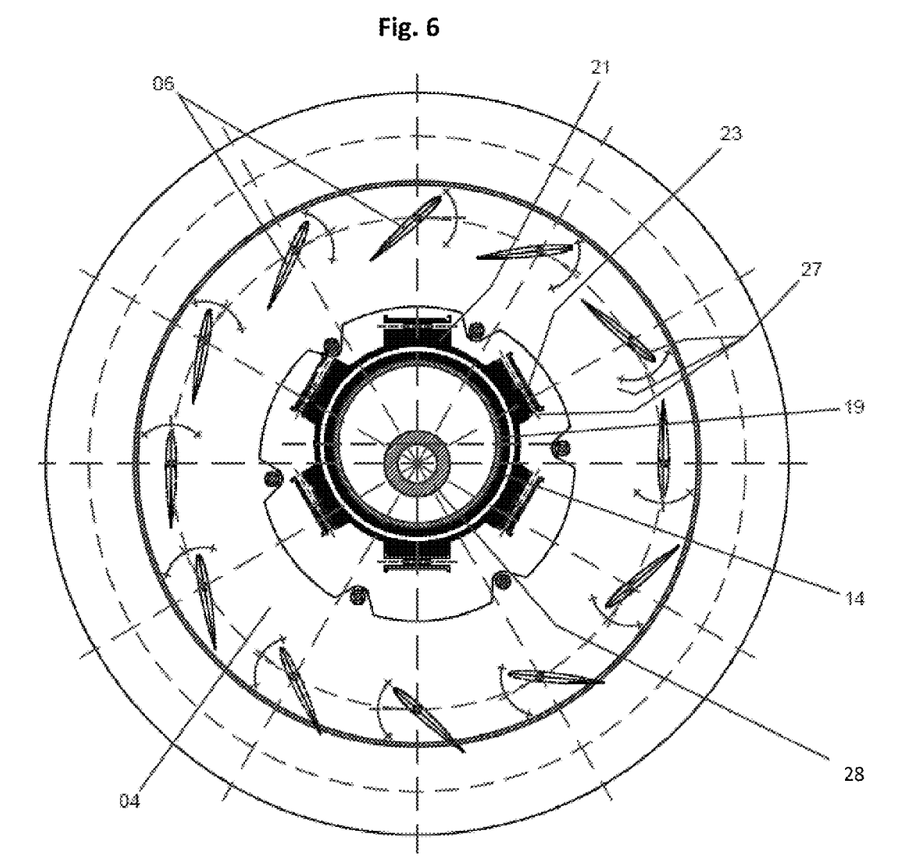
Figure 7:
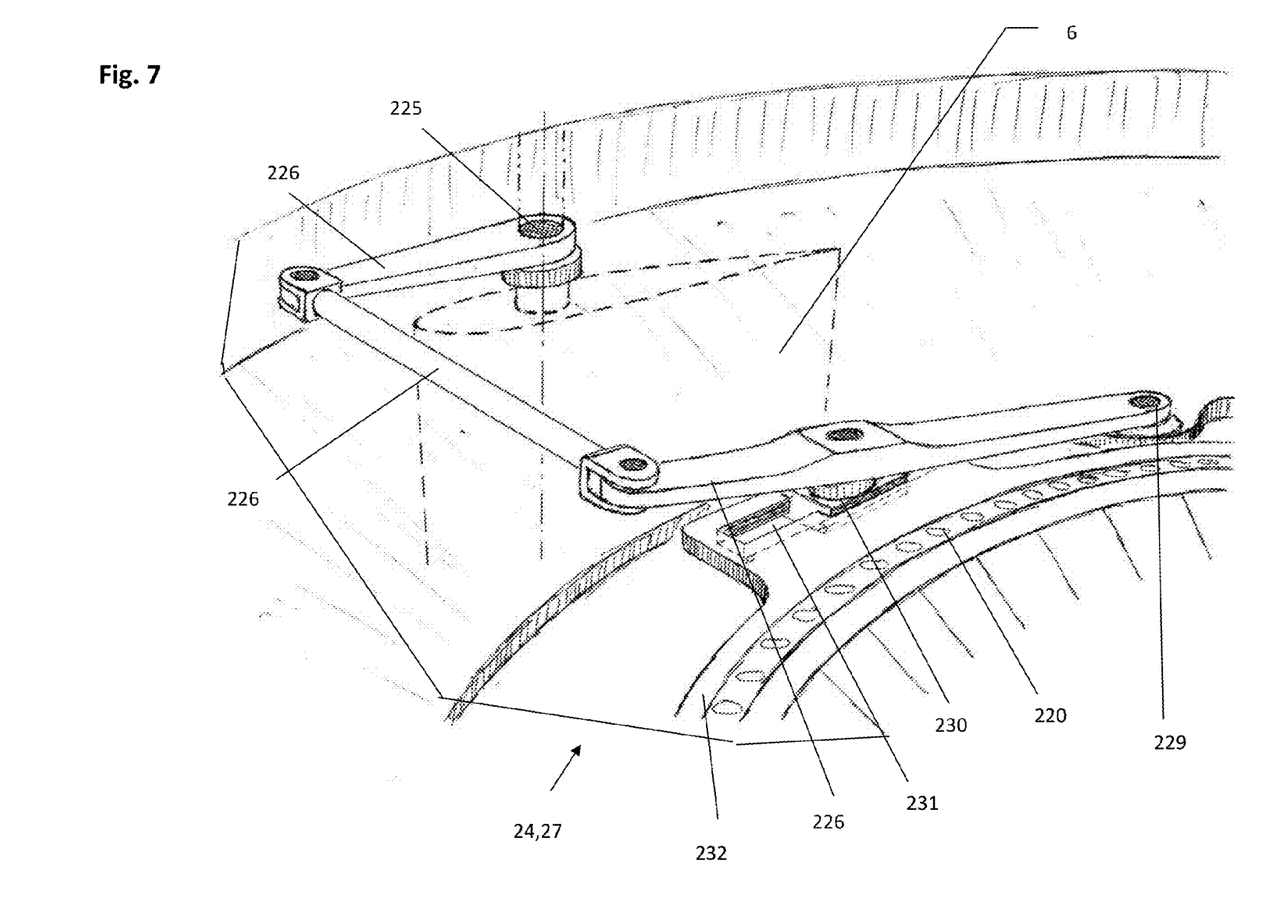
FIG. 7 shows a schematic view of detail VII of FIG. 5.
Figure 8:
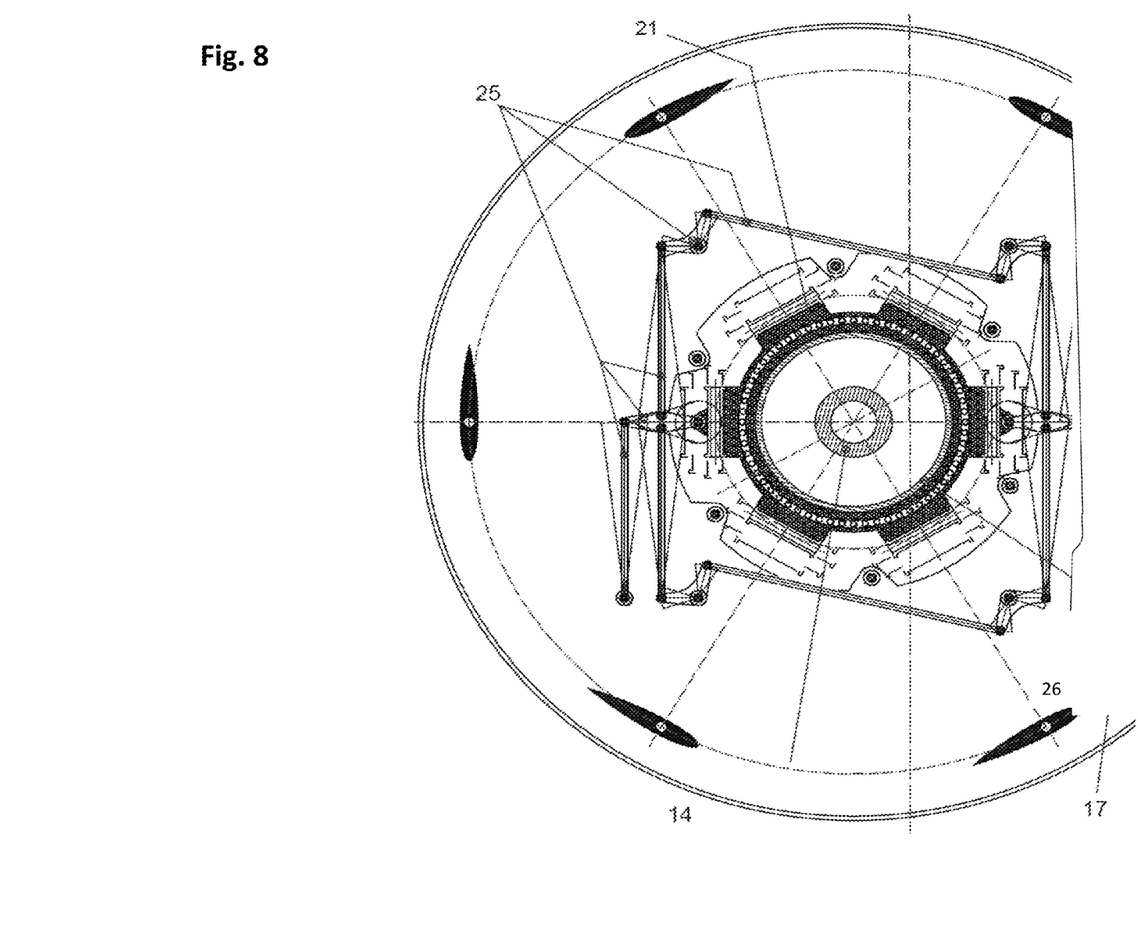
FIGS. 8 and 9 schematically show a partial front view of an external and an internal impeller, respectively, with crank drive control of the block.
Figure 9:
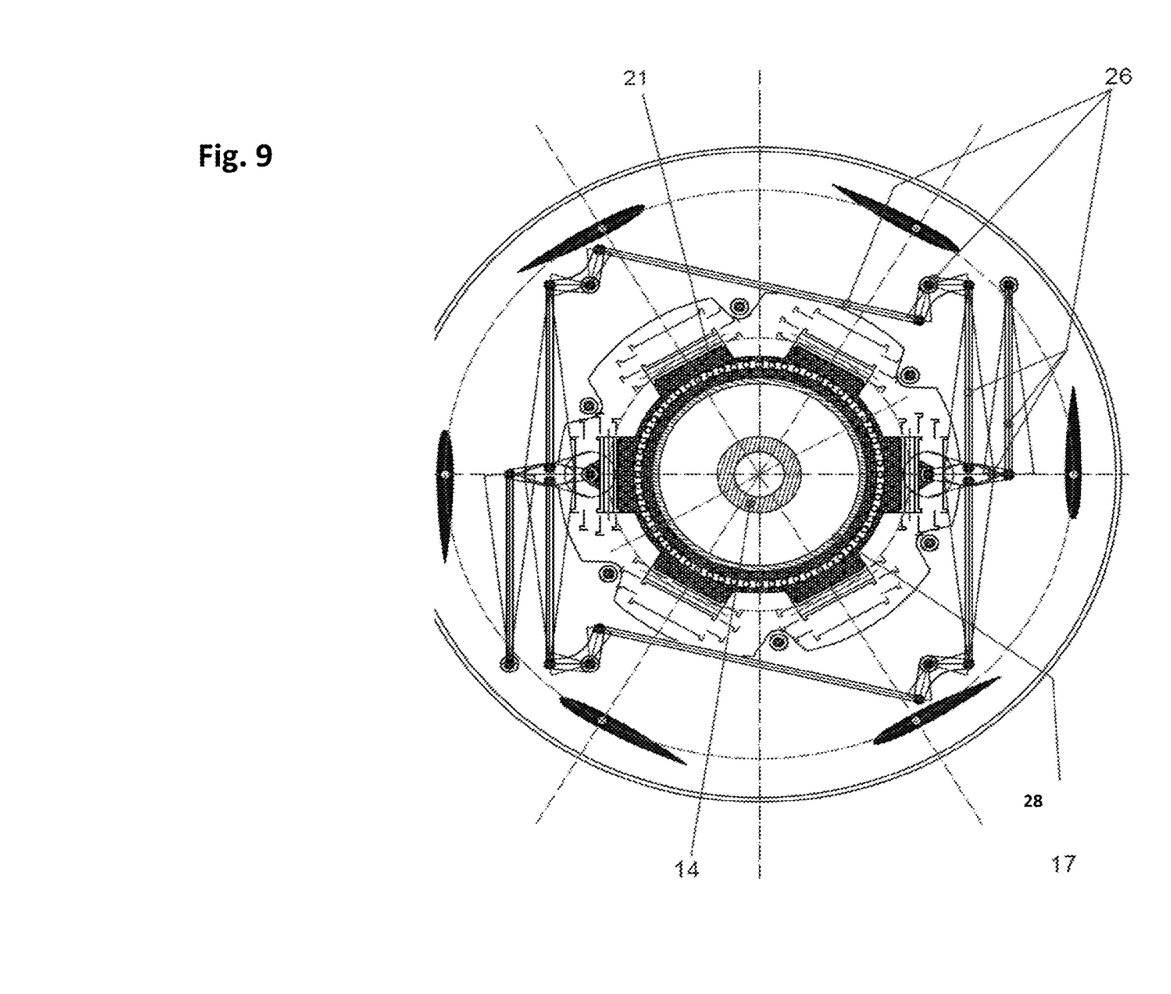

In FIG. 7, by way of example, a leverage system is represented, consisting of a quadrilateral 24, 27, both for the blade 6 of the internal impeller 4 and the external one 3. One of the ends of an arm 226 is articulated to each axis 225, whose other end is articulated to one of the ends of a connection rod 227 whose other end is articulated to one of the ends of a lever 228 articulated in a pivoted point 229 to the bottom of the respective impeller 3, 4. The lever 228 is rocking-lever articulated to a sliding block 230 in a guide 231 integral with the collar ring rotating on the bearing 220.

Figure 10:
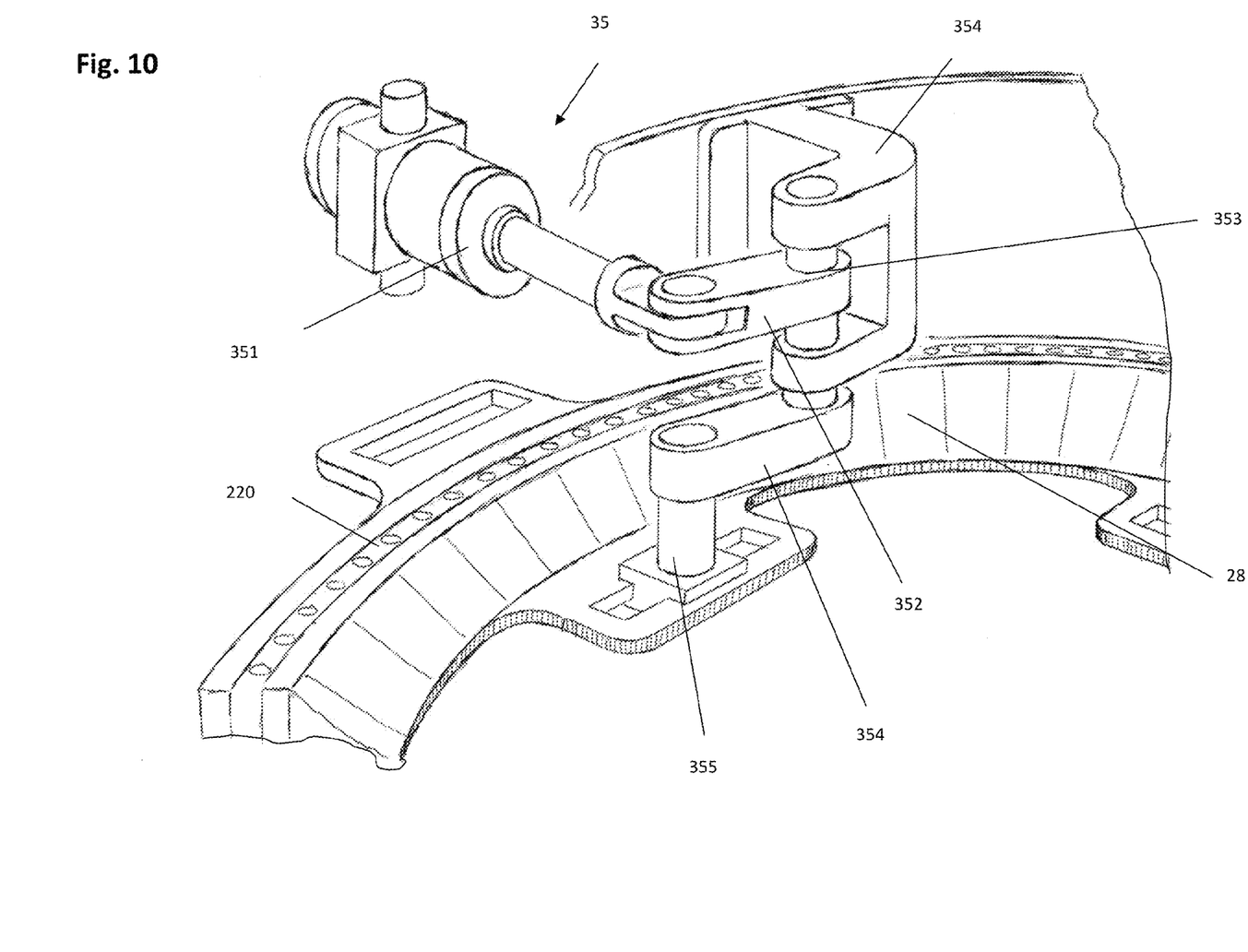
FIG. 10 schematically represents a perspective view of detail X of FIG. 4.

FIG. 10 shows the actuator system 35 in which each actuator 351 has a piston stem at whose free end one of the ends of an arm 352 is articulated, whose other end is articulated to pin 353 rotating in a flange 354 integral with the machine body. An end of the pin 353 is articulated to one of the ends of an arm 354 whose other end is articulated to a pin 355 housed in a housing 356 integral with the collar 28.

Figure 11:
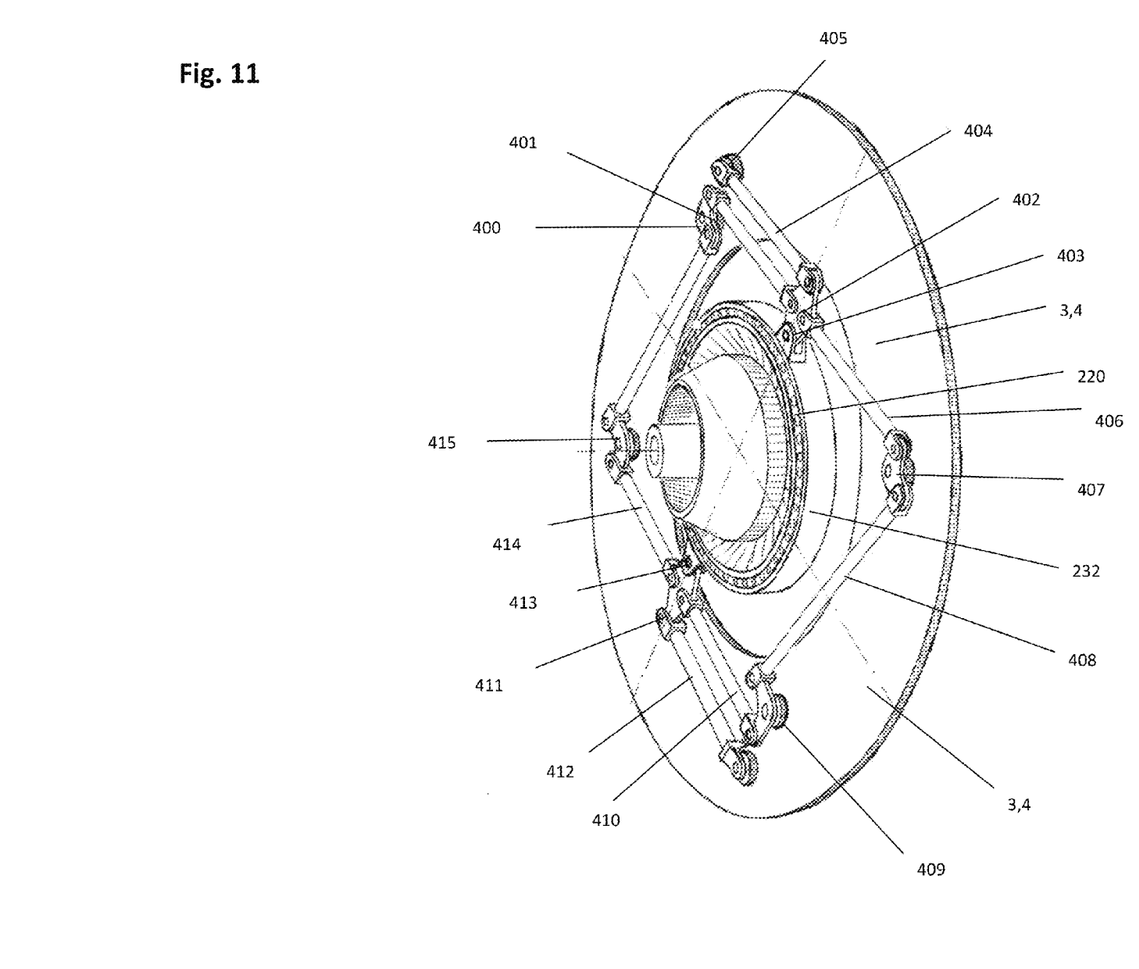
FIG. 11 schematically shows a perspective view of the crank mechanism of the impellers for pulling the guide rings of the blocks in coincidence with the rotation of the respective impeller.

FIG. 11 shows a preferred pull embodiment of the collar-slot-block assembly in coincidence with the respective impeller.

In it each impeller 3, 4 is articulated at its bottom to one of the ends of a first elbow lever 400 at whose other end a first rod 401 is articulated in turn articulated to a shackle 402 which is also articulated to a lug 403 integral with the ring 232. A first orientation lever 404 is also articulated to the shackle 402 articulated in 405 to the bottom of the impeller 3, 4. A second rod 404 is also articulated to the shackle 402 in turn also articulated to a second elbow lever 407 to which one of the ends of a third rod 408 is articulated, whose other end is articulated to a third elbow lever 409 to which a fourth rod 410 is articulated joined to a second shackle 411 to which a second orientation lever 412 is also articulated and it is articulated to a second lug 413 integral with the ring 232 and to which a fifth rod 414 is articulated in turn articulated to a fourth elbow lever 415 which is also articulated to the aforementioned first elbow lever 400.

The invention claimed is:

1. A fluid dynamic machine with at least one impeller, comprising a body, the at least one impeller including a first impeller and a second impeller rotatably housed by the body, at least two blades rotatably arranged, uniformly distributed along a circumference of the at least one impeller and supported with a parallel axis to an axis of the at least one impeller, a shaft of the first impeller being connected to a first motion transmission means and a second impeller being connected to a second motion transmission means on a bottom of the second impeller, and the bottom of the second impeller is concentric with a bottom of the shaft of the first impeller, the first motion transmission means of the first impeller and the second motion transmission means of the second impeller are connected in a common drive shaft, wherein each blade axis is connected with an element that is capable of being moved with respect to a shaft of the second impeller through a serially articulated connector that is located in a plane perpendicular to the axis of the blade and that comprises a first arm of the connector integral with the axis of the blades, a second arm of the connector being pivoted on the bottom of the second impeller, whereas another end of the second arm is connected to an end of the first arm through a connection axis, the second arm being hinged on the bottom of the at least one impeller and being articulated to a sliding block in an integral guide with a movement element, a block-guide system combined with a turning rotation leading to a control of the respective blade with harmonic motion according to a variable curve with an axis coinciding with a part of circumference of the second impeller.

2. The machine according to claim 1, wherein a coinciding motion of bearing collars of each respective impeller on which the block-guide pairs are mounted for the control of the articulations of the serially articulated connector, and the impeller blades are actuated by a system of leverages and rods, the geometry of the leverages and rods of constraints and joints leads to an angular synchrony between the bearing collars and the each respective impeller, but leaving the same bearing collar free to be moved at the same time in the radial directions with respect to a longitudinal axis envisaged on the orientation plane.

3. The machine according to claim 2, wherein the leverage and rods system consists of the connector both for the blade of an internal impeller as the first impeller and for an external impeller as the second impeller, one of the ends of the first arm being articulated to each blade axis, another end of the first arm being articulated to one of two ends of a connection rod, the connection rod's other end is articulated to one of the ends of a lever articulated in a pivoted point to the bottom of the respective internal or external impeller, the lever being rocking-lever articulated to a sliding block in a guide integral with a ring or collar rotating on the bearing collars.

4. The machine according to claim 1 wherein the movement element comprises a supported and articulated carrier, being equipped with a spherical surface housed in a corresponding housing of the machine body; actuating means are provided to move the carrier with the carrier's pivot in a centre of rotation resting on the central axis of the machine, to eccentrically oscillate the carrier; on the carrier, a collar resting in a plane is arranged in a sliding manner in a direction at right angles to the shaft of the impeller; and the collar itself mounts a radial bearing respectively for each impeller with respect to the shaft of the impeller, from which a respective connector of the blade leverages are moved through a block-guide pairs; and the pivot of the oscillation of the carrier and the articulation of the actuating means, are inverted in the positioning, except for the decentralisation efficacy of the block-guide collar.

5. The machine according to claim 4 wherein the collar is moved with the block-guide system sliding in integral slots appropriately obtained in the geometry of the collar, and each block is articulated to the centre with a radially arranged shaft and parallel to the central axis of the machine, the machine is integral with a lever with an arch movement on a plane parallel to that of the impeller, which in turn is integral and moved by a shaft with a parallel axis to the central shaft, articulated to the corresponding housing of the machine structure and equipped with another arm moved by an actuator articulated to the machine structure.

6. The machine according to claim 1, wherein the machine further comprises a plurality of counter-rotating impellers synergized with the blades in the fluid; this combined with appropriate angular speeds of each impeller minimises the reactive, torsional and direction derivation effects, as well as making the thrust of any entity on the axis of rotation coincide.

7. The machine according to claim 1, wherein a system of actuators comprises a plurality of actuators, each actuator having a piston stem at a free end of which one of the ends of a connection arm is articulated, other end of the connection arm is articulated to a pivot rotatable in a flange integral with the body of the machine, one end of the pivot being articulated to one of the ends of the connection arm whose other end is articulated to a pivot housed in a housing integral with a carrier.

8. The machine according to claim 1, wherein one of the ends of a first elbow lever is articulated at the bottom of the first or second impeller, another end of the first elbow lever is articulated to a first rod, the first rod is articulated in turn articulated to a shackle which is also articulated to a lug integral with a ring, a first orientation lever also being articulated to the shackle articulated to the bottom of the first or second impeller, a second rod also being articulated to the shackle in turn also articulated to a second elbow lever to which one of the ends of a third rod is articulated, whose other end is articulated to a third elbow lever to which a fourth rod is articulated joined to a second shackle to which a second orientation lever is also articulated and it is articulated to a second lug integral with the ring and to which a fourth rod is articulated in turn articulated to a fourth elbow lever which is also articulated to the aforementioned first elbow lever.

\* \* \* \* \*